US010488014B2

(12) United States Patent
Johnson

(10) Patent No.: US 10,488,014 B2
(45) Date of Patent: Nov. 26, 2019

(54) DISPLAY INCLUDING SWITCHABLE BACKLIGHT AND FRONT SURFACE FILM

(71) Applicant: 3M INNOVATIVE PROPERTIES COMPANY, St. Paul, MN (US)

(72) Inventor: Nicholas A. Johnson, Burnsville, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/737,172

(22) PCT Filed: Jun. 14, 2016

(86) PCT No.: PCT/US2016/037426
§ 371 (c)(1),
(2) Date: Dec. 15, 2017

(87) PCT Pub. No.: WO2016/205237
PCT Pub. Date: Dec. 22, 2016

(65) Prior Publication Data
US 2018/0187860 A1 Jul. 5, 2018

Related U.S. Application Data

(60) Provisional application No. 62/188,213, filed on Jul. 2, 2015, provisional application No. 62/180,555, filed on Jun. 16, 2015.

(51) Int. Cl.
F21V 3/04 (2018.01)
G02F 1/13 (2006.01)
(Continued)

(52) U.S. Cl.
CPC ............ *F21V 3/049* (2013.01); *G02F 1/1323* (2013.01); *G02F 1/133504* (2013.01);
(Continued)

(58) Field of Classification Search
CPC ... F21V 3/049; H05B 33/0845; G02B 6/0096; G02F 1/1323; G02F 1/133504;
(Continued)

(56) References Cited

U.S. PATENT DOCUMENTS 8,662,692 B2 * 3/2014 Huang ................. G06F 1/1626
362/97.1
2008/0198295 A1 8/2008 Yuuki
(Continued)

FOREIGN PATENT DOCUMENTS

EP 2023191 2/2009
WO WO 2015-153329 10/2015

OTHER PUBLICATIONS

International Search Report for PCT International Application No. PCT/US2016/037426, dated Oct. 19, 2016, 8 pages.

*Primary Examiner* — Bao Q Truong
*Assistant Examiner* — Jessica M Apenteng
(74) *Attorney, Agent, or Firm* — Michael Stern

(57) ABSTRACT

Displays (100) including switchable backlight (110, 200) and front surface films (120) are disclosed. Displays with switchable backlights (110) that use a front surface film (120) to reduce the visibility of a display outside an intended viewing area (112, 226) in ambient light are also disclosed. The switchable backlight (110, 200) has two different output modes with different viewing cones (112, 114; 226, 236) to limit visibility to different angular ranges.

12 Claims, 2 Drawing Sheets

(51) Int. Cl.
  *G02F 1/1335* (2006.01)
  *H05B 33/08* (2006.01)
  *F21V 8/00* (2006.01)

(52) U.S. Cl.
  CPC ... *G02F 1/133615* (2013.01); *H05B 33/0845* (2013.01); *G02B 6/0096* (2013.01); *G02F 1/133526* (2013.01); *G02F 2001/133562* (2013.01); *G02F 2001/133626* (2013.01)

(58) Field of Classification Search
  CPC ......... G02F 1/133615; G02F 1/133526; G02F 2001/133562; G02F 2001/133626
  USPC ....................................................... 362/97.1
  See application file for complete search history.

(56) References Cited

U.S. PATENT DOCUMENTS

| | | | | |
|---|---|---|---|---|
| 2011/0102721 A1* | 5/2011 | Enomoto | .......... | G02F 1/133536 349/137 |
| 2014/0071658 A1* | 3/2014 | Weber | .................. | G02B 6/0055 362/97.1 |
| 2014/0286044 A1* | 9/2014 | Johnson | ................. | G02B 5/021 362/607 |
| 2014/0355250 A1* | 12/2014 | Tyan | .................... | G02B 5/0226 362/97.1 |
| 2017/0175976 A1 | 6/2017 | Johnson | | |

* cited by examiner

DISPLAY INCLUDING SWITCHABLE BACKLIGHT AND FRONT SURFACE FILM

BACKGROUND

Switchable backlights provide different output distributions through a variety of means. These may be narrow and wide output distributions. Front surface films are used on the front surface of displays to provide an anti-glare surface, a more pleasant tactile experience, scratch resistance to the rest of the display components, or some combination thereof. Front surface films typically have a moderate to light haze value (<50%), because too much haze reduces contrast and produces pixel blur.

SUMMARY

In one aspect, the present description relates to a display viewable through a front surface. The display includes a switchable backlight, where the switchable backlight has at least a first output mode and a second output mode, and where the first mode has a first luminance distribution with a full-width half-maximum greater than 40 degrees and the second mode has a second luminance distribution with a full-width half-maximum of no more than 40 degrees. The display also includes a front surface film disposed as the front surface of the display, the front surface film having a haze of at least 35%.

In another aspect, the present description relates to a display viewable through a front surface. The display includes a switchable backlight, where the switchable backlight has at least a first output mode and a second output mode, and where the first output mode as a first luminance distribution with a first peak intensity and a first viewing cone centered around the first peak intensity, and where the second output mode has a second luminance distribution with a second peak intensity, and a second viewing cone centered around the second peak intensity. The display also includes a front surface film, where the front surface film has a haze of at least 50%.

In yet another aspect, the present description relates to a method of reducing the readability of information from a display in ambient light outside of an intended viewing area. The method includes providing a display including a switchable backlight, where the switchable backlight has at least a first output mode and a second output mode, and where the first mode has a first luminance distribution with a full-width half-maximum greater than 40 degrees and the second mode has a second luminance distribution with a full-width half-maximum no more than 40 degrees and centered on a normal of the display. The method further includes providing a front surface film on the display having a haze value high enough to reduce the visibility of the display when the switchable backlight is in the second mode for a viewer viewing the display in ambient light at an angle more oblique than 40 degrees.

In another aspect, the present description relates to a display viewable through a front surface. The display includes a switchable backlight, where the switchable backlight has at least a first output mode and a second output mode, and where the first output mode has a first luminance distribution with a first peak intensity and a first viewing cone centered around the first peak intensity, and where the second output mode has a second luminance distribution with a second peak intensity and a second viewing cone centered around the second peak intensity. The display also includes a front surface film disposed as the front surface of the display, the front surface film having a haze high enough such that under ambient light with an illuminance of 500 lux, a viewer viewing the display when the backlight is in the second output mode, from outside the second viewing cone, is unable to distinguish whether the switchable backlight is on or off.

DETAILED DESCRIPTION

Figure 1:
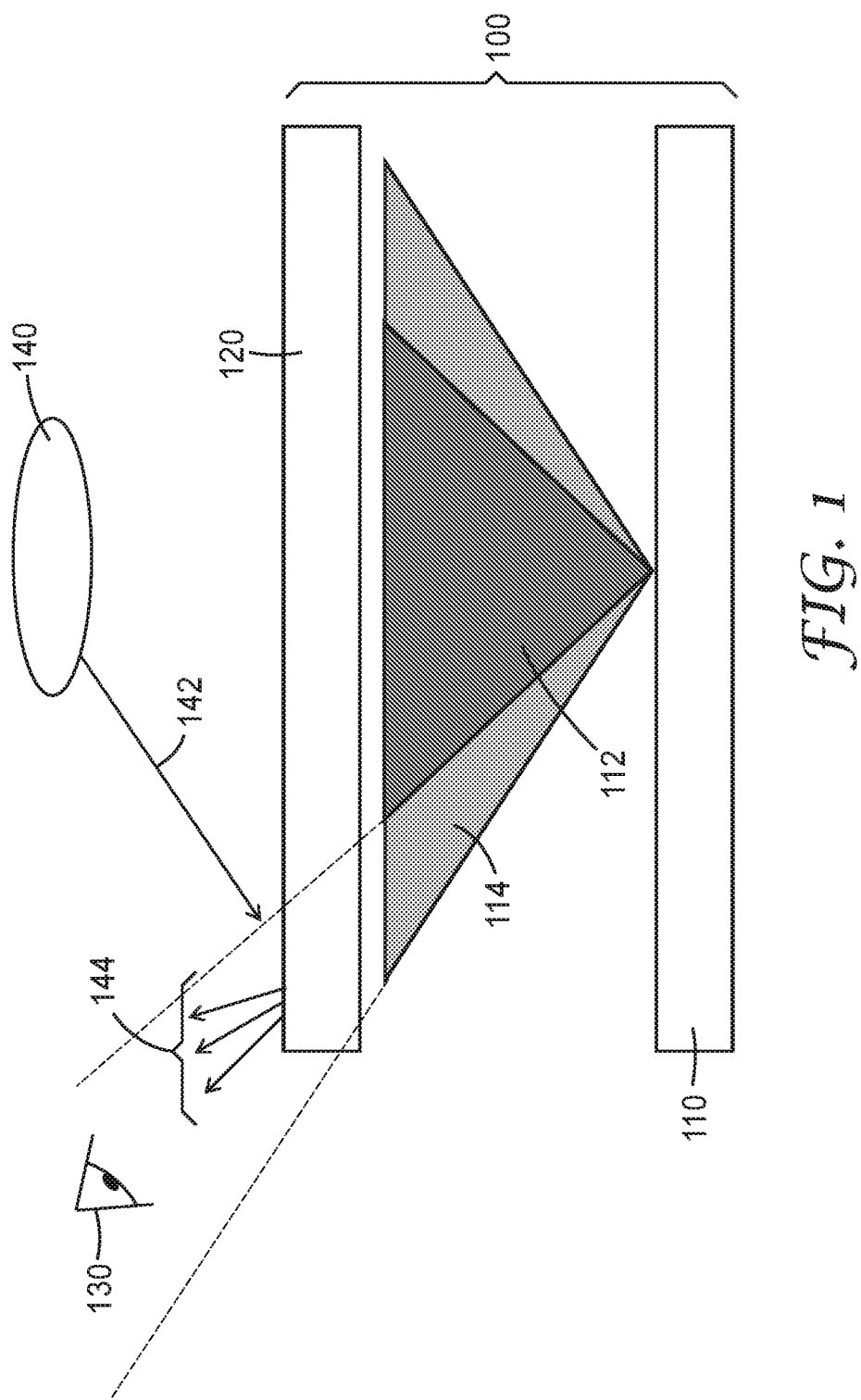
FIG. 1 is an elevation view of a display including a switchable backlight and a front surface film.

FIG. 1 is an elevation view of a display including a switchable backlight and a front surface film. Display 100 includes switchable backlight 110 and front surface film 110. Switchable backlight produces first output mode with first viewing cone 112 and second output mode with second viewing cone 114. Viewer 130 observes display 100 from within the first viewing cone but not the second viewing cone. Light 142 from ambient light source 140 is scattered by front surface film 120 and reflects to viewer 130 as scattered light 144.

Switchable backlight 110 may be any suitable switchable backlight with at least two output modes. The two output modes have different angular light distributions. The viewing angles at which each output mode is visible may be referred to as its viewing cone. The viewing cone may be characterized or bounded by its full-width half-maximum, or its full-width 10%-maximum, or its full-width 5%-maximum. The first output mode has a first viewing cone 112 and the second output mode has a second viewing cone 114. In some embodiments, switchable backlight 110 may have a wide viewing cone and a narrow viewing cone centered around a normal of the display, as shown in FIG. 1. In some embodiments, the viewing cones may be separated, for example, for left and right eyes, or for presenting information differently selectively to two side-by-side viewers. For ease of illustration, the viewing cones are depicted as coming from a single point on the surface of switchable backlight 110; however, it is more accurate to consider these viewing cones as coming from each point on the emission surface of the backlight.

Considering viewer 130, such a viewer should be able to view light from the display when the switchable backlight is in the first output mode producing first viewing cone 112 but not when it is in the second output mode producing second viewing cone 114. However, for some switchable backlights, there is not a sharp cutoff at the boundaries of the viewing cone (for example, it may be still 50% of its maximum luminance, or 10% of its maximum luminance, or 5% of its maximum luminance). Therefore, it may be possible for viewer 130, even not being within the first but not the second viewing cone, to nonetheless view light from the display when the switchable backlight is in the second output mode.

In some cases, particularly where the output modes are meant to select which viewers are able to view light or read information from the display (i.e., for privacy applications), this may be undesirable or unacceptable.

Surprisingly, providing a front surface film with a high haze (higher than values typically used on the front of displays) may eliminate this unwanted visibility by utilizing scattered reflections of ambient light in a room. For example, ambient light source 140 (which, though depicted as a discrete source may simply be the presence of light in a room or area) is reflectively scattered by the diffusing properties of front surface film 120. Light 142 from ambient light source 140 is scattered into scattered light 144. Scattered light 144 is observed by viewer 130 at the same time dim light from outside of the viewing cone of the current output mode is incident on viewer 130. If light 142 from ambient light source is bright enough, the visibility of the dim light, or specifically the readability or visibility of information on the display, from outside of the viewing cone of the current output mode may be reduced. In some embodiments, the dim light from outside of the viewing cone of the current output mode may be so dim compared to the scattered light from the ambient light source that a viewer is unable to distinguish whether the backlight is on or off. In some embodiments, ambient light with an illuminance of 500 lux is sufficient such that a viewer is unable to distinguish whether the backlight is on or off. In some embodiments, ambient light with a luminance of 600 lux is sufficient. In some embodiments, ambient light with a luminance of 700 lux, 800 lux, or 1000 lux is sufficient such that a viewer is unable to distinguish whether the backlight is on or off. In these cases, the reflected ambient light may have a luminance of at least 5 cd/m$^2$, or at least 10 cd/m$^2$.

Front surface film 120 may have a haze higher than 35%, higher than 40%, higher than 45%, 50%, higher than 70%, or higher than 80%. Front surface film 120 may be a surface diffuser, a bulk diffuser, or both. Front surface film 120 may have any suitable dimensions and may be formed from any suitable materials. In some embodiments, front surface film 120 may be selected for its transparency, rigidity, pencil hardness, or other physical or optical properties. In some embodiments, front surface film 120 may be or include a switchable diffuser, such as polymer dispersed liquid crystal or smectic A based switchable diffusers. Front surface film 120 may be formed from any suitable process, such as a cast-and-cure microreplication process or by casting a film of a resin including diffusive particles. In some embodiments, front surface film 120 may be a polymeric film. In some embodiments, front surface film 120 may include a diffractive grating. In some embodiments, the display may include a cover lens disposed on front surface film 120.

Figure 2:
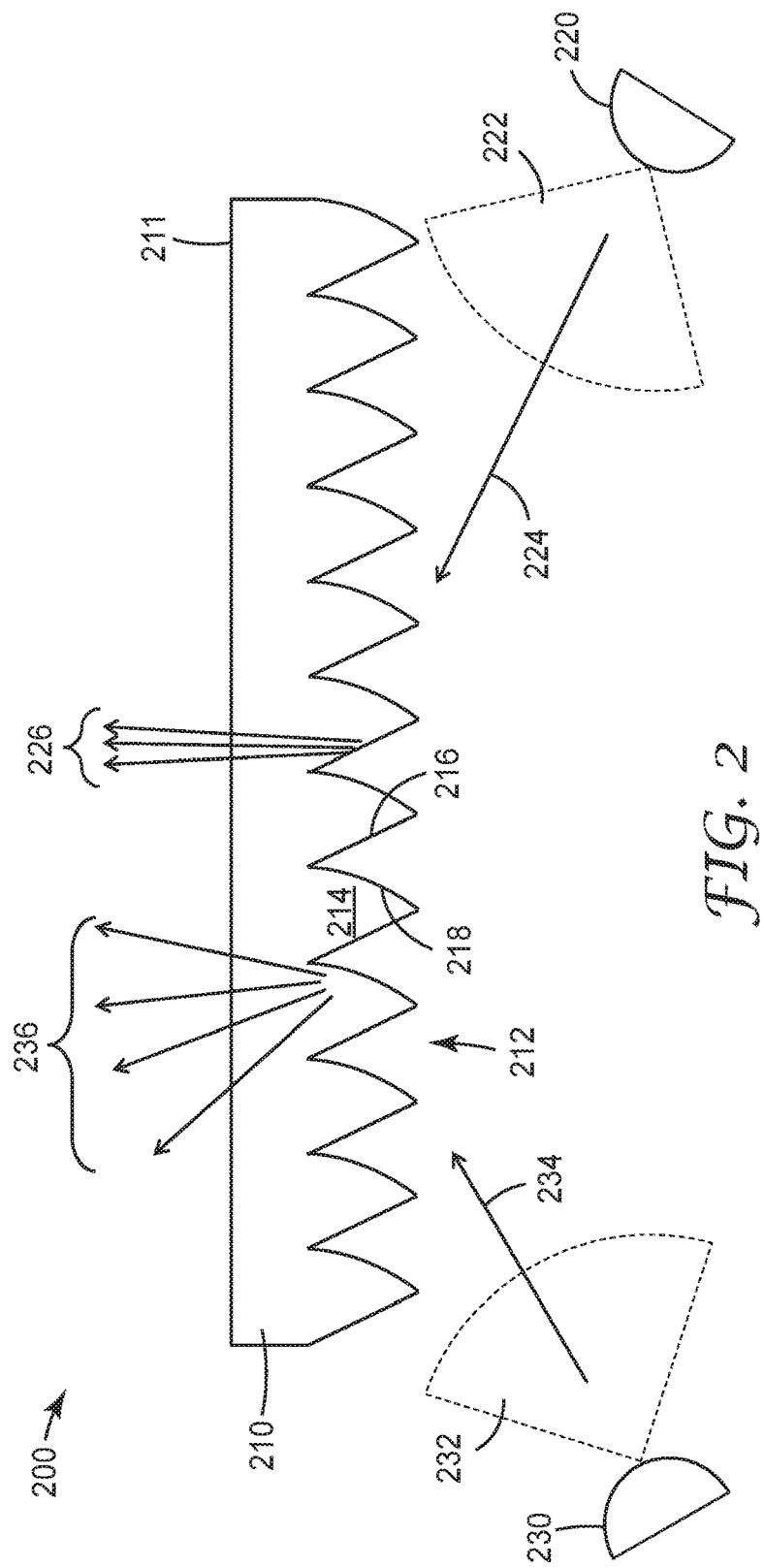
FIG. 2 is an elevation view of an exemplary switchable backlight.

FIG. 2 is an elevation view of an exemplary switchable backlight. Switchable backlight 200 includes asymmetric turning film 210 having microstructures 214 with first face 216 and second face 218, first light source 220 having first light distribution cone 222 and first exemplary ray 224, second light source 230 having second light distribution cone 232 and second exemplary ray 234, first output distribution 226 associated with first light source 220 and first face 216, and second output distribution 236 associated with second light source 230 and second face 218.

Asymmetric turning film 210 may be any suitable thickness and may be made from any suitable material. In some embodiments, asymmetric turning film 210 will be formed from a polymeric material, such as polycarbonate, polyethylene terephthalate, polyethylene naphthalate, poly(methyl methacrylate) and copolymers and blends of the same. In some embodiments, asymmetric turning film 210 may be optically transparent or have low haze and high clarity to avoid undesirably scattering incident light. In some embodiments, the asymmetric turning film may have a sufficiently high index of refraction, such as 1.5 or greater, to ensure that total internal reflection occurs at a sufficiently broad range of angles. Other appropriate materials include acrylics, polystyrenes, methyl styrenes, acrylates, polypropylenes, polyvinyl chlorides, and the like. In some embodiments the material, dimensions, or both of asymmetric turning film 210 may be selected in order to produce a flexible film.

First smooth surface 211 is substantially smooth. However, first smooth surface 211 need not be completely smooth in all embodiments, and may qualify as a substantially smooth surface as long as the surface does not contain microstructures. For example, an anti-wetout or anti-glare beaded coating may be included or incorporated on the surface of first smooth surface 211, and such a surface may still be considered substantially smooth for the purposes of this application. In other words, smooth is not used in the sense of not rough; instead, it is used in the sense of not structured.

Second structured surface 212 includes microstructures 214. Each of microstructures 214 may be linear microstructures; that is, microstructures 214 may extend along a direction with substantially the same or identically the same cross-sectional shape (in the exemplary configuration of FIG. 2, along the axis into/out of the page). Microstructures 214, and more generally, the second structured surface 212 of asymmetric turning film 210 may be formed through any suitable process, such as a microreplication process. For example, second structured surface 212 may be formed through cutting (fly cutting, thread cutting, diamond turning or the like) a suitable tool with the negative of the desired structure and pressing a compliant but curable or hardenable material against the tool surface. The material may be subsequently hardened or cured (for example, through exposure to light such as ultraviolet light), leaving second structured surface 212 with the desired features. Other processes may be possible, including casting and curing with an electroplated, laser cut, or etched tool, using photolithography such as two-photon mastering of a tool in conjunction with a cast and cure process, or even direct machining or an additive three-dimensional printing process.

Microstructures 214 may all be the same or they may different. In some embodiments, microstructures of two or more types alternate or vary in a pattern or without a discernable pattern. Each of microstructures 214 has a first face 216 and a second face 218. First face 216 and second face 218 optically correspond to first light source 220 and second light source 230. In that sense, first face 216 preferentially reflects light from first light source 220 but not second light source 230, and second face 218 preferentially reflects light from second light source 230. The overall arrangement of the microstructures on second structured surface 212 may have any suitable pitch and may or may not have land (flat areas) between microstructures 214. Microstructures 214 may be any appropriate size, and in many cases may be on the millimeter or micrometer scale, in some cases between 10 and 100 micrometers or between 10 and 300 micrometers. The pitch or size of microfeatures 214 may increase, decrease, both increase and decrease, or remain constant for all or portions of second structured surface 212.

First light source 220 and second light source 230 may be any suitable light source or combination of light sources. In many cases, light sources for first light source 220 and second light source 230 are light emitting diodes (LEDs). First light source 220 and second light source 230 are referred to in the singular, but each may represent a bank or series of light sources. For example, first light source 220 may be a series of LEDs extended along the axis into/out of the page. In some embodiments, light sources emit substantially white light. In some embodiments, certain of the components of first light source 220 and second light source 230 emit light of different wavelengths that may together create white light. "White" light may refer to any suitable desirable color point that may be perceived as a viewer as white light and may be adjusted or calibrated depending on the application. In some embodiments, first light source 220 and/or second light source 220 may emit light in one or more of the ultraviolet range, the visible range, or the near-infrared range of the electromagnetic spectrum. First light source 220 and second light source 230 may also be cold cathode fluorescent lights (CCFLs) or even, in some embodiments, incandescent light sources. The light sources and any corresponding injection, collimation, or other optics may be selected to provide any suitable wavelength or combination of wavelengths, polarizations, point spread distributions, and degrees of collimation.

Because first face 216 reflects light preferentially from first light source 220 but not second light source 230, and second face 218 reflects light preferentially from second light source 230 but not first light source 220, asymmetric turning film 210 essentially functions as a first film having first faces when first light source 220 is illuminated, like a second film having second faces when second light source 230 is illuminated, or even as both first and second films when both the first and second light sources are illuminated.

Microstructures 214 are illustrated in FIG. 2 as being substantially identical for ease of illustration, but the microstructures may change shape, size, rotation, or pitch along one or more portions of asymmetric turning film 210. In some embodiments, microstructures 214 are spatially variant, and in some embodiments there may be discrete portions of microstructures 214 having similar characteristics, but different characteristics from neighboring portions of asymmetric turning film 210.

Light from first light source 220 is emitted within first light distribution cone 222. The degree of collimation may depend on both light source 220 and any accompanying collimation or injection optics (for example, a lightguide). In some embodiments, particularly when first light source 220 includes a bank of parallel light sources, the light distribution cones effective merge to create an extended wedge (for example, as if the cross-section of the first light distribution cone were projected into or out of the page). The light distribution cone may also be an extended wedge in embodiments where the light sources are linear light sources, such as a CCFL tube. In any event, for explanatory purposes, light from first light source 220 is represented by first exemplary ray 224, which is incident on asymmetric turning firm 210. Because asymmetric turning film 110 will have an index of refraction higher than air, light traveling from air into the turning film (as depicted in FIG. 2) will be refracted but not substantially reflected by second face 218, except from Fresnel reflections at the interface. These Fresnel reflections may be reduced by providing an anti-reflection coating or treatment on the surface of the asymmetric turning film. In some embodiments, anti-reflection may be provided by an antireflective structured surface, such as a moth's eye structure or the like. Exemplary ray 224 is then substantially reflected by first face 216, provided that the incidence angle is subcritical for the turning film/air interface as to be totally internally reflected. The reflection off first face 216 for all of light emitted from first light source 220 incident on asymmetric turning film 210 produces a first output distribution 226 having a first set of characteristic viewing angles. An observer viewing switchable backlight 200 would perceive light only at the characteristic viewing angles (at least for light corresponding to first light source 220).

Similarly, for light from second light source 230, light falls within second light distribution cone 232, and is represented by second exemplary ray 234. The first and second light sources have differently oriented light distributions. Exemplary ray 234 is refracted as it passes through first face 216 but is substantially not reflected (except for Fresnel reflections). Second exemplary ray 234 is reflected at the interface created by second face 218, where the sum of all light emitted from second light source 220 incident on asymmetric turning film 210 produces second output distribution 236 having a second set of characteristic viewing angles. The second set of characteristic viewing angles may be different from the first set of characteristic viewing angles, as depicted in FIG. 2. This may be due to the face geometry, the size and overall arrangement of the microstructures and their placement relative to the light sources, or the optical characteristics of the light sources including wavelength, collimation, and emission distribution (i.e., Lambertian). To minimize scattering, antireflective coatings may be placed on the microstructures, the backside of the turning film, or even on other components of the overall system not pictured, including polarizers and the like.

In some embodiments, switchable backlight 200 includes one or more lightguides. Lightguides are generally solid transparent optical components that transport light through total internal reflection and have carefully designed and arranged features or specific geometries to provide control over the extraction of light along its length and/or width. In these cases, it may be useful to think of each point on the emission surface of the lightguide (in the reference frame of FIG. 2, likely the top) as being a virtual source of a light distribution cone such as those associated with the light sources. The design and geometry of the lightguide (such as, for example, a wedge-shaped lightguide) and the shape and distribution of extractors may alter the shape or width of such light distribution cones. Certain extractor designs may be used to emit highly collimated light at a desired angle. In some embodiments, switchable backlight 200 may include just one lightguide, with each of the light sources configured to inject light into sides of the lightguide. In some embodiments, one of the first and second light sources injects light into a lightguide, but the other of the first and second light sources does not. In some embodiments, there are two lightguides, which may be stacked or otherwise disposed vertically, and the first and second light sources are coupled to inject light into the first and second lightguide, respectively. Switchable backlight 200 may also include a specular or semi-specular reflector disposed on the side of the lightguide or lightguides opposite the turning film.

In some embodiments, switchable backlight 200 may include a hollow lightguide. In some embodiments, such a hollow lightguide may be made of a pair of highly reflective specular, semi-specular, or diffusely reflective films, such as multilayer reflectors like Enhanced Specular Reflector (ESR) and Enhanced Diffuse Reflector (EDR) (available from 3M Company, St. Paul, Minn.), separated by a certain distance. Light may be reflected and transported in air along the hollow lightguide between the films. In some embodiments, the desired output surface or surfaces of the lightguide may have perforations or areas of diminished reflectivity (i.e. increased transmission) to selectively transmit light. These perforations or transmission areas may be arranged in any useful pattern, including a gradient, pseudorandom, or uniform arrangement. In some cases, a transflector may be provided as one or both of the films in the hollow lightguide. The transflector may be a partial reflector, a reflective polarizer, or even a brightness enhancing film. The partial reflection of the transflector helps the light travel along the hollow lightguide, while the partial transmission of the transflector allows light to exit the lightguide toward the rest of switchable backlight 200.

Descriptions for elements in figures should be understood to apply equally to corresponding elements in other figures, unless indicated otherwise. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A display viewable through a front surface, comprising:
    a switchable backlight, wherein the switchable backlight has at least a first output mode and a second output mode, and wherein the first mode has a first luminance distribution with a full-width half-maximum greater than 40 degrees and the second mode has a second luminance distribution with a full-width half-maximum of no more than 40 degrees; and
    a front surface film disposed as the front surface of the display, the front surface film having a haze of at least 35%.
2. The display of claim 1, wherein the front surface film includes a surface diffuser.
3. The display of claim 1, wherein the front surface film includes a bulk diffuser.
4. The display of claim 1, wherein the second luminance distribution is centered around a normal to the display.
5. The display of claim 1, wherein the front surface film has a haze of at least 40%.
6. The display of claim 1, wherein the front surface film has a haze of at least 50%.
7. The display of claim 1, wherein the front surface film has a haze of at least 70%.
8. The display of claim 1, wherein the front surface film has a haze of at least 80%.
9. The display of claim 1, further comprising a cover lens disposed on the front surface film.
10. A method of reducing the readability of information from a display in ambient light outside of an intended viewing area, the method comprising:
    providing a display including a switchable backlight, wherein the switchable backlight has at least a first output mode and a second output mode, and wherein the first mode has a first luminance distribution with a full-width half-maximum greater than 40 degrees and the second mode has second luminance distribution with a full-width half-maximum no more than 40 degrees and centered on a normal of the display; and
    providing a front surface film on the display having a haze value high enough to reduce the visibility of display when the switchable backlight in the second output mode for a viewer viewing the display in ambient light at an angle more oblique than 40 degrees.
11. A display viewable through a front surface, comprising:
    a switchable backlight, wherein the switchable backlight has at least a first output mode and a second output mode, and wherein the first output mode has a first luminance distribution with a first peak intensity and a first viewing cone centered around the first peak intensity, and wherein the second output mode has a second luminance distribution with a second peak intensity and a second viewing cone centered around the second peak intensity; and
    a front surface film disposed as the front surface of the display, the front surface film having a haze of at least 50%.
12. A display viewable through a front surface, comprising:
    a switchable backlight, wherein the switchable backlight has at least a first output mode and a second output mode, and wherein the first output mode has a first luminance distribution with a first peak intensity and a first viewing cone centered around the first peak intensity, and wherein the second output mode has a second luminance distribution with a second peak intensity and a second viewing cone centered around the second peak intensity; and
    a front surface film disposed as the front surface of the display, the front surface film having a haze high enough such that under ambient light with an illuminance of 500 lux, a viewer viewing the display when the backlight is in the second output mode, from outside the second viewing cone, is unable to distinguish whether the switchable backlight is on or off.

* * * * *